(12) United States Patent
Imamura et al.

(10) Patent No.: US 10,175,724 B2
(45) Date of Patent: Jan. 8, 2019

(54) PORTABLE INFORMATION PROCESSING DEVICE AND METHOD OF UNITING UNITS OF PORTABLE INFORMATION PROCESSING DEVICE

(71) Applicant: KABUSHIKI KAISHA TOSHIBA, Minato-ku, Tokyo (JP)

(72) Inventors: Shigeharu Imamura, Ome Tokyo (JP); Tsutomu Saigusa, Ome Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/288,737

(22) Filed: Oct. 7, 2016

(65) Prior Publication Data

US 2017/0102737 A1    Apr. 13, 2017

(30) Foreign Application Priority Data

Oct. 7, 2015    (JP) .................... 2015-199134

(51) Int. Cl.
   *G06F 1/16*    (2006.01)

(52) U.S. Cl.
   CPC .......... *G06F 1/1633* (2013.01); *G06F 1/1626* (2013.01); *G06F 1/1669* (2013.01)

(58) Field of Classification Search
   CPC ..... G06F 1/1633; G06F 1/1669; G06F 1/1626

USPC ..................................................... 361/679.55
See application file for complete search history.

(56) References Cited

U.S. PATENT DOCUMENTS

| | | | |
|---|---|---|---|
| 6,870,732 B2 * | 3/2005 | Huang .................. | G06F 1/1626 220/230 |
| 2004/0174670 A1 | 9/2004 | Huang et al. | |
| 2008/0158800 A1 * | 7/2008 | Aoyagi ................. | G06F 1/1616 361/679.01 |
| 2013/0279096 A1 * | 10/2013 | Gengler ................... | H05K 7/00 361/679.01 |
| 2014/0211395 A1 | 7/2014 | Lin et al. | |
| 2016/0048173 A1 * | 2/2016 | Lyles .................... | G06F 1/1681 361/679.17 |

FOREIGN PATENT DOCUMENTS

| | | |
|---|---|---|
| JP | 11-345041 | 12/1999 |
| JP | 2004-272869 | 9/2004 |
| JP | 2014-149820 | 8/2014 |

* cited by examiner

*Primary Examiner* — Tuan T Dinh
*Assistant Examiner* — Rockshana D Chowdhury
(74) *Attorney, Agent, or Firm* — Rutan & Tucker, LLP

(57) ABSTRACT

According to one embodiment, a portable information processing device includes first and second units, each having a flat approximately rectangular solid case. The first unit has as many magnets as the second unit has. Each of the magnets of the first unit attracts corresponding magnet of the second unit when the case of the first unit and the case of the second unit are placed one upon the other.

6 Claims, 5 Drawing Sheets

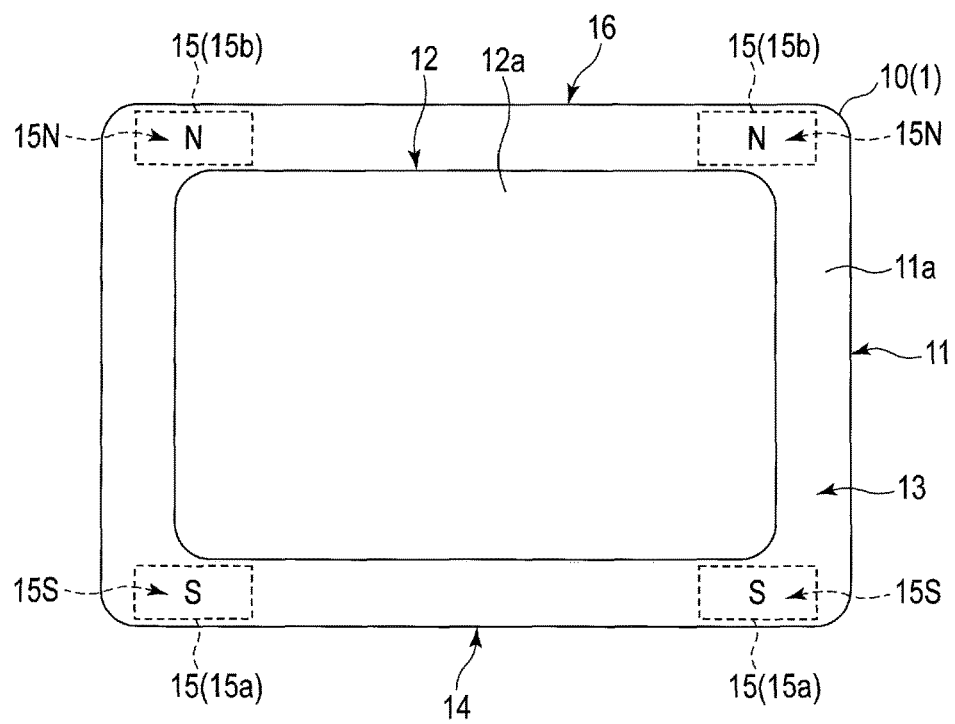
F I G. 1
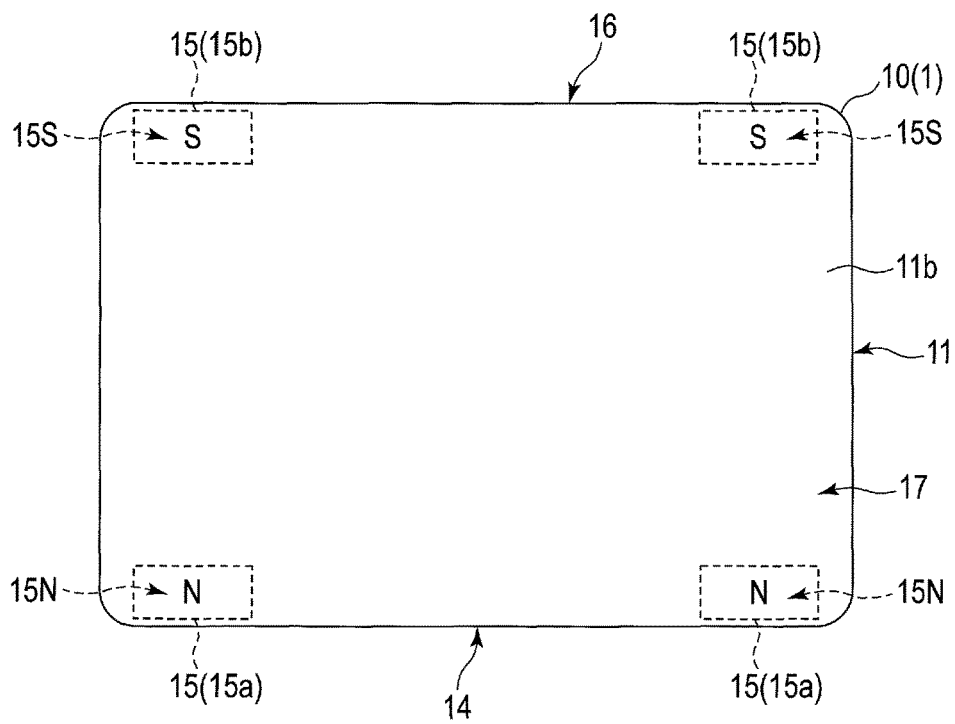
F I G. 2

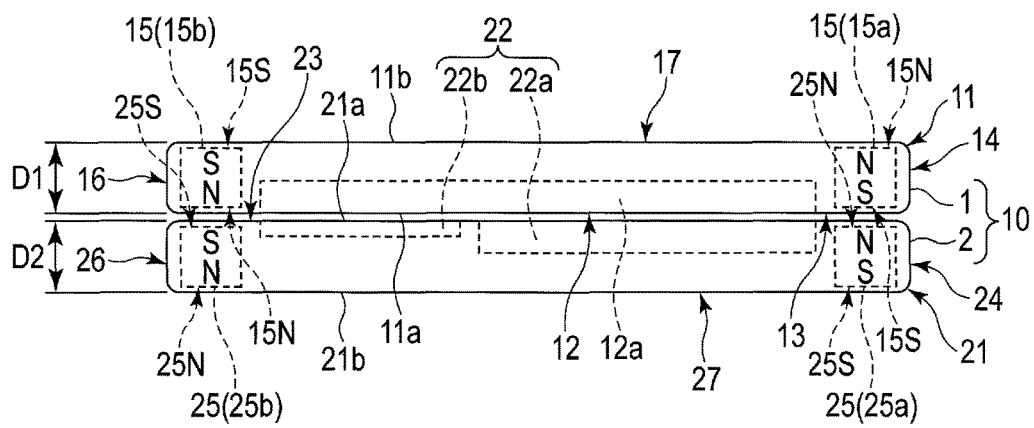
F I G. 5
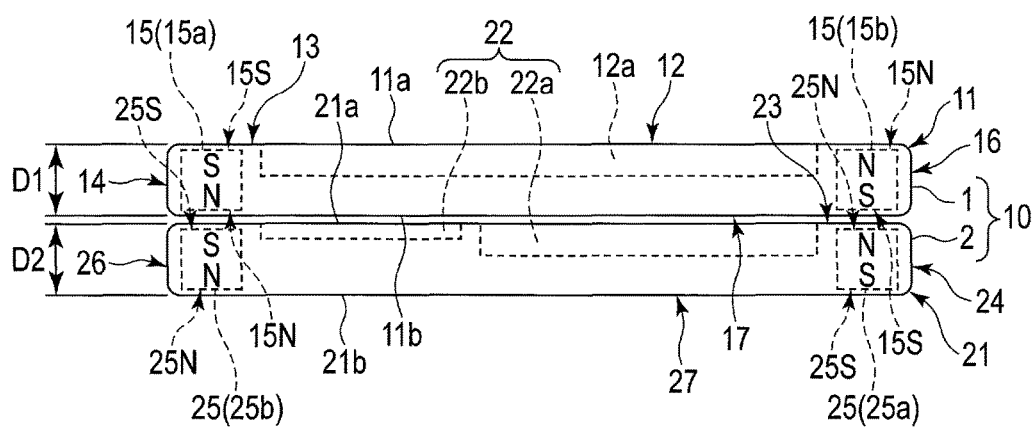
F I G. 6

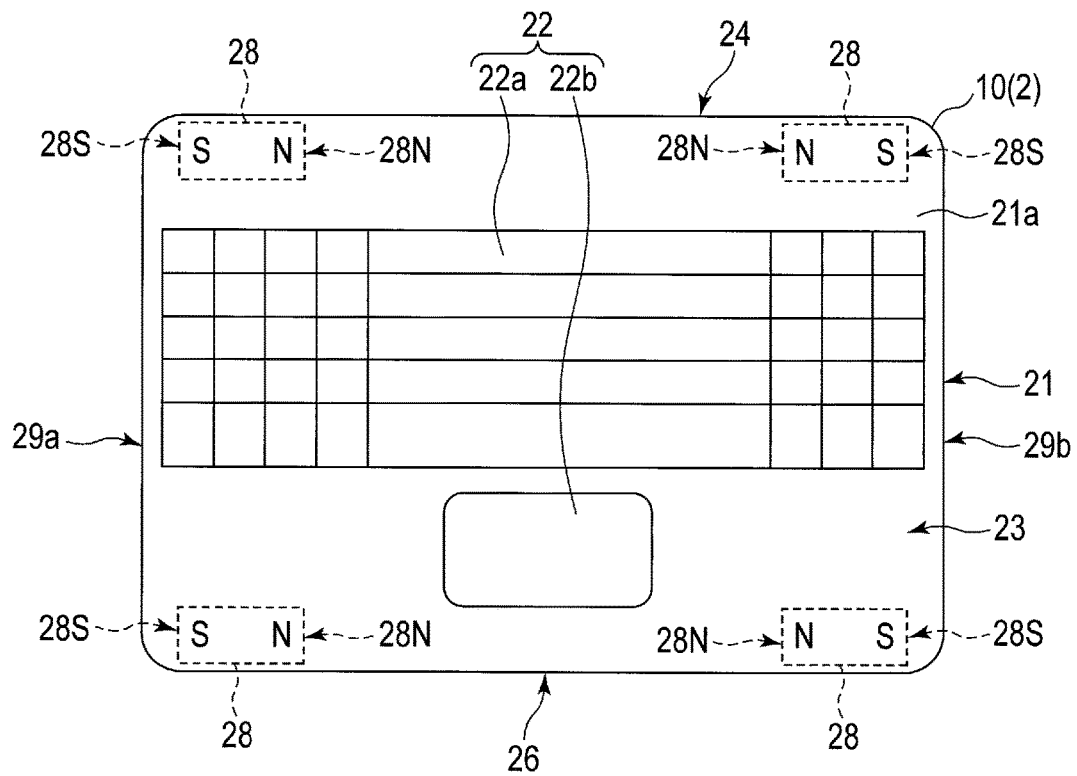
F I G. 9
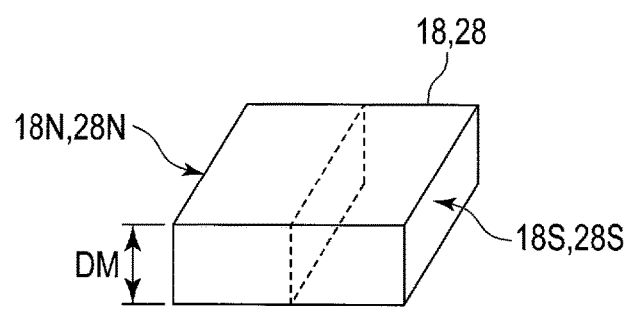
F I G. 10

PORTABLE INFORMATION PROCESSING DEVICE AND METHOD OF UNITING UNITS OF PORTABLE INFORMATION PROCESSING DEVICE

CROSS-REFERENCE TO RELATED APPLICATIONS

This application is based upon and claims the benefit of priority from Japanese Patent Application No. 2015-199134, filed Oct. 7, 2015, the entire contents of which are incorporated herein by reference.

FIELD

Embodiments described herein relate generally to a portable information processing device comprising two units and a method of uniting two units of a portable information processing device.

BACKGROUND

In recent years, various kinds of portable information processing devices have become common, tablet computers being typical examples of such devices. A tablet computer has a flat approximately rectangular solid case. The case accommodates a processing module, a control module, a communication module, and other elements. The case has one flat surface provided with a display panel (user interface section). The tablet computer is operated by touching the panel. However, to improve convenience, a separate human interface device can be attached to the tablet computer when needed. For example, a keyboard can be connected by a cable or wirelessly to make character input, etc., easy.

A tablet computer and a keyboard are separate from each other, but they can be connected with each other whenever necessary, thereby improving convenience. However, the tablet computer and the keyboard must be carried separately, which may be awkward. To improve portability, it is possible to use a case which accommodates both the tablet computer and the keyboard. However, it is then necessary for the user to walk around with a case in addition to the tablet computer and the keyboard, and this may be inconvenient. To cope with this problem, it is possible to use a hinge mechanism whereby the tablet computer supports the keyboard in the way a clamshell notebook computer does. However, it is then necessary to additionally provide a separate hinge mechanism, which may make the entire system bulky. The addition of a separate hinge mechanism is not desirable from the point of view of slimming down the tablet computer or the keyboard.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary view illustrating one outer flat-surface of a first unit which is one of two constituents of a portable information processing device in one embodiment.

FIG. 2 is an exemplary view illustrating the other outer flat-surface of the first unit of the portable information processing device in the embodiment.

FIG. 5 is an exemplary view illustrating a state (a first state) where the first unit and the second unit are properly positioned and united in such a manner that the cases of the portable information processing device are placed one upon the other.

FIG. 6 is an exemplary view illustrating another state (a second state) where the first unit and the second unit are properly positioned and united in such a manner that the cases of the portable information processing device are placed one upon the other.

FIG. 9 is an exemplary view illustrating another exemplary magnet arrangement applicable to the second unit of the portable information processing device in the embodiment.

FIG. 10 is an exemplary perspective view illustrating another structure of a magnet (belonging to a first group of magnets or a second group of magnets) of the portable information processing device in the embodiment.

DETAILED DESCRIPTION

Figure 3:
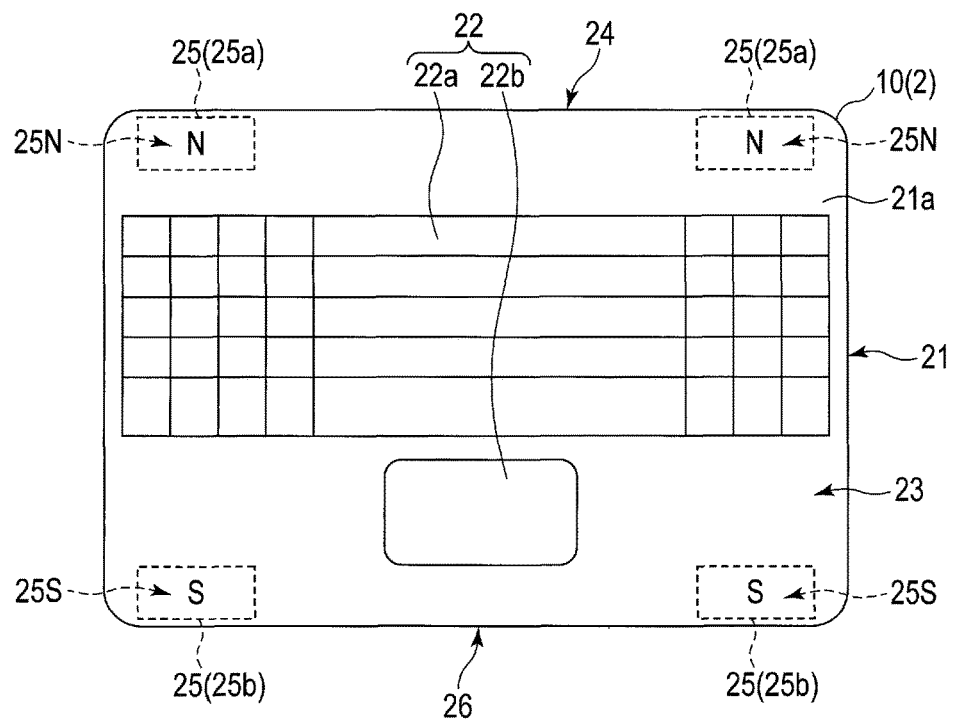
FIG. 3 is an exemplary view illustrating one outer flat-surface of a second unit which is the other of the two constituents of the portable information processing device in the embodiment.

Various embodiments will be described hereinafter with reference to the accompanying drawings. In general, according to one embodiment, a portable information processing device comprises first and second units. The first and second units comprises a flat approximately rectangular solid case having one flat surface, with a user interface section being included in the one flat surface, the other flat surface opposite to the one flat surface, a first one side, a first other side opposite to the first one side, a second one side, and a second other side opposite to the second one side. The first and second units are configured to be capable of being unitedly placed one upon the other and to capable of being separated from each other.

The first unit has a first group of magnets in the case. Some of the first group of the magnets are arranged along the first one side of the case. The rest of the first group of the magnets are arranged along the first other side of the case. Some of the first group of the magnets are arranged along the first one side have an opposite magnetic polarity to a magnetic polarity of the rest of magnets arranged along the first other side.

The second unit has a second group of magnets in the case of the other unit. Some of the second group of the magnets are arranged along the first one side of the case of the other unit. The rest of the second group of the magnets are arranged along the first other side of the case. Some of the second group of the magnets are arranged along the first one side have an opposite magnetic polarity to a magnetic polarity of the rest of the second group of magnets arranged along the first other side. Each of the first group of the magnets respectively corresponds and is placed upon each of corresponding the second group of the magnets. The corresponding magnets of the first and second group have an opposite magnetic polarity with each other.

Hereafter, a portable information processing device in one embodiment (hereinafter simply referred to as an "information processing device") will be explained with reference to FIGS. 1-7, taking a tablet computer having a keyboard as an example.

As illustrated in FIGS. 1-7, an information processing device 10 in one embodiment comprises two units (first unit 1 and second unit 2). It should be noted here that an example in which one of the two units 1 is a tablet computer and the other of the two units 2 is a keyboard will be illustrated below. However, it is not restricted to such a combination.

The first unit (tablet computer) 1 and the second unit (keyboard) 2 each have a shape of a flat approximately rectangular solid. The case (the first case 11) of the first unit 1 and the case (the second case 21) of the second unit 2 are of the same approximately rectangular solids (Cases 11 and 21 are the same in thickness-wise projected shape, which is approximately rectangular). Each of cases 11 and 21 has round four corners. Cases 11 and 21 are placed one upon the other. Accordingly, it is desirable for cases 11 and 21 that the thickness-wise projected shape should be the same. It is however possible that cases 11 and 21 may not be the same in thickness.

The first unit 1 and the second unit 2 have their individual cases 11 and 21 respectively accommodating the user interface sections 12 and 22. As illustrated in FIG. 1 and FIG. 2, the first unit 1 is provided with a display section (henceforth a display section 12) as the user interface section 12. The display section 12 is a liquid crystal or an organic electroluminescence panel 12a provided in a flat surface 11a of case 11, for example. The first case 11 has a frame section 13 surrounding the display section 12. The frame section 13 is approximately flush with the panel 12a of the display section 12, and constitutes flat surface 11a of the first case 11 along with the display section 12. It should be noted that, although not illustrated in particular, the first unit 1 has in the first case 11 not only the display section 12 but also a control section, an operation section, a storage section, a communications section, etc.

Figure 4:
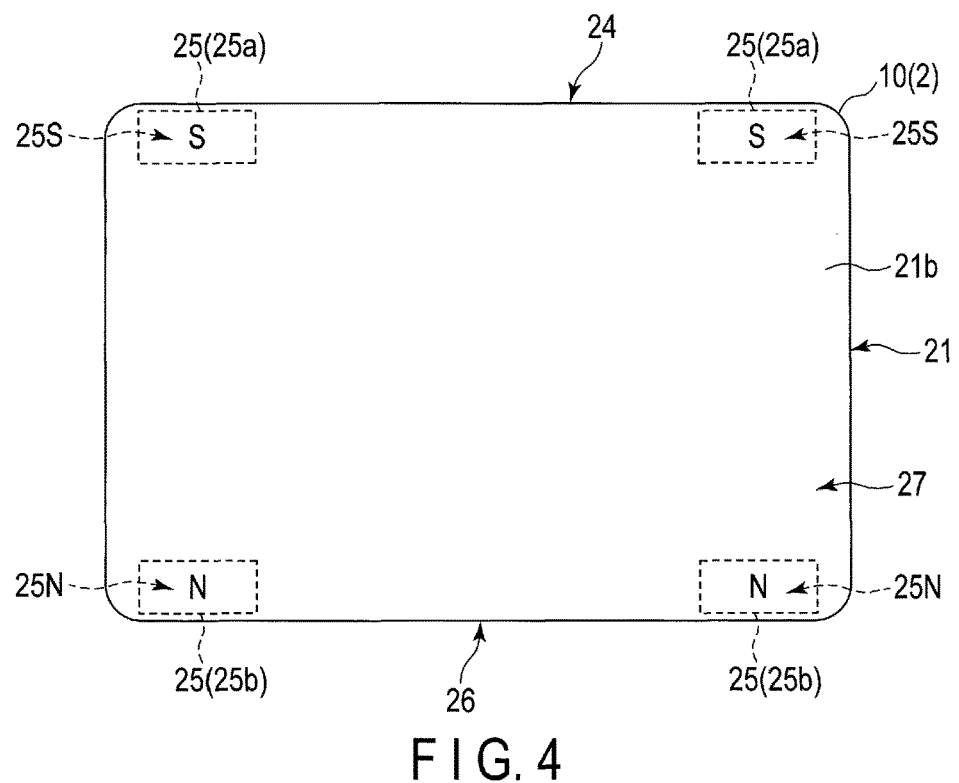
FIG. 4 is an exemplary view illustrating the other outer flat-surface of the second unit of the portable information processing device in the embodiment.

As illustrated in FIG. 3 and FIG. 4, the second unit 2 is provided with a console as the user interface section 22 (henceforth a console 22). The console 22 comprises, for example, many keys 22a and a touchpad 22b. The keys 22a and the touchpad 22b are provided in flat surface 21a of the second case 21. The console 22 is surrounded with the frame section 23 of the second case 21. The frame section 23 is flat and slightly higher than the top position of each of the keys 22a of the console 22. The frame section 23 constitutes flat surface 21a of the second case 21. It should be noted that, although not illustrated in particular, the second unit 2 may be provided with a control section, a communications section, etc., in addition to the console 22. What is necessary is merely to accommodate them in the second case 21. It is furthermore possible to construct the console 22 from the keys 22a alone without the touchpad 22b.

The first unit 1 and the second unit 2 can be attached to and detached from each other because of a releasable engagement between one side 14 of case 11 and one side 24 of case 21. For example, a concave engagement slot (an illustration omitted) is formed in the second case 21. A part of the one side 14 of the first case 11 (henceforth one side part) is inserted into the engagement slot. In this way, both units 1 and 2 are suitably attached to each other. It is this engagement that will electrically connect the first unit 1 and the second unit 2. For example, a command inputted from the console 22 of the second unit 2 with the use of the keys 22a or the touchpad 22b may be subjected to an operation process in the first unit 1, and the results may be displayed on the display section 12 of the first unit 1. In this case, the first unit 1 and the second unit 2 may be attached to each other in such a manner that both the display section 12 and the console 22 (namely, flat surfaces 11a and 21a) may face the user. The information processing device 10 therefore can be used in the same way as a notebook computer.

Each of the one side part of the first case 11 and the engagement slot of the second case 21 has a connector (an illustration omitted) for electrically connecting the first unit 1 and the second unit 2. It is possible to provide magnets etc. in addition to the connectors in order to hold the posture of both units 1 and 2 after units 1 and 2 have been attached to each other. Regardless of whether both units 1 and 2 are attached to each other to form a single body, both units 1 and 2 can be electrically connected to each other by a cable or by radio. The engagement slot may be formed by making a narrow dent near the one side 24 of the one flat surface 21a of the second case 21. Alternatively, an attachment portion having an engagement slot may be formed near the one side 24. All that should be done to separate the first unit 1 and the second unit 2 after they have been combined to each other is to draw out one side part of the first case 11 from the engagement slot of the second case 21. Thereby, the electric connection between the first unit 1 and the second unit 2 is cut off.

The first unit 1 and the second unit 2 respectively have magnets 15 and magnets 25. Magnets 15 and magnets 25 are equal in number. Each of magnets 15 attracts a corresponding one of magnets 25 when case 11 and case 21 are properly placed one upon the other. Each of magnets 15 is arranged in case 11 in such a manner that one of its two magnetic pole surfaces faces flat surface 11a and the other magnetic pole surface faces an opposite flat surface 11b. Similarly, each of magnets 25 is arranged in case 21 in such a manner that one of its two magnetic pole surfaces faces flat surface 21a and the other magnetic pole surface faces an opposite flat surface 21b. The attraction between the first group of the magnets 15 and the second group of the magnets 25 causes the first unit 1 and the second unit 2 to be suitably put into their respective positions and firmly united in such a manner that case 11 and case 21 are placed one upon the other.

The first case 11 is provided with the first group of the magnets 15 in such a manner that some of the first group of the magnets 15 are arranged along one side 14 and the rest are arranged along the other side 16 opposite to the one side 14. Each of the former magnets that are arranged along the one side 14 is placed such that one of its two magnetic pole surfaces faces flat surface 11a (in other words, the display section 12), whereas each of the latter magnets that are arranged along the other side 16 is placed such that the other of its two magnetic pole surfaces faces flat surface 11a. Namely, the first magnets 15a arranged along the one side 14 of the first case 11 and the first magnets 15b arranged along the other side 16 of the first case 11 are placed such that the magnetic pole surfaces of the first magnets 15a facing flat surface 11a may be different in magnetic polarity from the magnetic pole surfaces of the first magnets 15b facing flat surface 11a. FIG. 1 and FIG. 2 both illustrate an example in which four first magnets 15 are arranged on the one flat surface 11a of the first case 11 in such a manner that two south poles may be arrayed along the one side 14 (the lower side in each of FIG. 1 and FIG. 2) and two north poles may be arrayed along the other side 16 (the upper side in each of FIG. 1 and FIG. 2).

The second case 21 is provided with the second group of the magnets 25 in such a manner that some of the second group of the magnets 25 are arranged along one side 24 and the rest are arranged along the other side 26 opposite to the one side 24. Each of the former magnets that are arranged along the one side 24 is placed such that one of its two magnetic pole surfaces faces flat surface 21a (in other words, the console 22), whereas each of the latter magnets that are arranged along the other side 26 is placed such that the other of its two magnetic pole surfaces faces flat surface 21a. Namely, the second magnets 25a arranged along the one side 24 of the second case 21 and the second magnets 25b arranged along the other side 26 of the second case 21 are placed such that the magnetic pole surfaces of the second magnets 25a facing flat surface 21a may be different in magnetic polarity from the magnetic pole surfaces of the second magnets 25b facing flat surface 21a. FIG. 3 and FIG. 4 both illustrate an example in which four second magnets 25a are arranged on the one flat surface 21a of the second case 21 in such a manner that two north poles may be arrayed along the one side 24 (the upper side in each of FIG. 3 and FIG. 4) and two south poles may be arrayed along the other side 26 (the lower side in each of FIG. 3 and FIG. 4).

It should be noted that, in contrast with the arrangement illustrated in FIG. 1 and FIG. 2, the four first magnets 15 may be arranged on the one flat surface 11a of the first case 11 in such a manner that two north poles may be arrayed along the one side 14 and two south poles may be arrayed along the other side 16. In this case, in contrast with the arrangement illustrated in FIG. 3 and FIG. 4, the four second group of the magnets 25 may be arranged on the one flat surface 21a of the first case 21 in such a manner that two south poles may be arrayed along the one side 24 and two north poles may be arrayed along the other side 26.

As illustrated in FIG. 1 to FIG. 4, the four first magnets 15 are arranged at the respective four corners of the first case 11, and the four second group of the magnets 25 are arranged at the respective four corners of the second case 21. The position obtained by projecting each of the first group of the magnets 15 along the thickness of the first case 11 coincides with the position obtained by projecting a corresponding one of the second group of the magnets 25 along the thickness of the second case 21. This makes it possible to cause each of the first group of the magnets 15 and a corresponding one of the second group of the magnets 25 to positively and powerfully attract each other on condition that cases 11 and 21 are placed one upon the other.

The first magnets 15a, which are arrayed along the one side 14 of the first case 11, and the second magnets 25b, which are arrayed along the other side 26 of the second case 21, are arranged in such a manner that their respective magnetic poles facing the one flat surface 11a should be the same in magnetic polarity. Similarly, the first magnets 15b, which are arrayed along the other side 16 of the first case 11, and the second magnets 25a, which are arrayed along the one side 24 of the second case 21, are arranged in such a manner that their respective magnetic poles facing the one flat surface 11a should be the same in magnetic polarity. This makes it possible to unitedly position the first unit 1 and the second unit 2 with case 11 and case 21 being suitably placed one upon the other in accordance with a user's natural manner of use.

FIG. 5 and FIG. 6 individually illustrate an example in which the first unit 1 and the second unit 2 are united in position with case 11 and case 21 being placed one upon the other. As illustrated in FIG. 5, the first case 11 and the second case 21 are placed one upon the other in such a manner that the one flat surface 11a of the first case 11 and the one flat surface 21a of the second case 21 may face each other. In this case, the first case 11 and the second case 21 are placed one upon the other in such a manner that the one side 14 and the one side 24 are flush with each other, the other side 16 and the other side 26 are flush with each other, and each of the first group of the magnets 15 and a corresponding one of the second group of the magnets 25 attract each other. Hereafter, this state is called a "first state."

When the first unit 1 and the second unit 2 are brought into the first state and united, the display section 12 and the console 22 will face each other and will be respectively protected by the first case 11 and the second case 21. Thus, the display section 12 and the console 22 will surely be prevented from suffering damage. When the first unit 1 is made to rotate with centering on an imaginary line defined by the combination of the one side 14 of the first unit 1 and the one side 24 of the second unit 2 from a state in which the display section 12 and the console 22 face a user to a state in which the display section 12 comes closer to the console 22, and when the first unit 1 finally covers the second unit 2, the first unit 1 and the second unit 2 will be in the same state as the first state.

Moreover, when the first case 11 and the second case 21 are placed one upon the other in such a manner that the opposite flat surface 11b of the first case 11 may face the one flat surface 21a of the second case 21 as illustrated in FIG. 6, each of the first group of the magnets 15 and a corresponding one of the second group of the magnets 25 will attract each other with the one side 14 facing in one direction and the one side 24 facing in another direction opposite to the one direction (namely, the one side 14 will be flush with the other side 26, and the other side 16 will be flush with the one side 24). Hereafter, this state is called a "second state."

When the first unit 1 and the second unit 2 are brought into the second state and united, the second unit (keyboard) 2 will not hinder making use of the first unit 1 as a tablet computer at the time of using the information processing device 10. When the one side 14 of the first unit 1 is pulled toward the other side 26 of the second unit 2 (or the user side) on condition that the display section 12 and the console 22 face the user, and when the first unit 1 finally covers the second unit 2, the first unit 1 and the second unit 2 will be in the same state as the second state.

Figure 7:
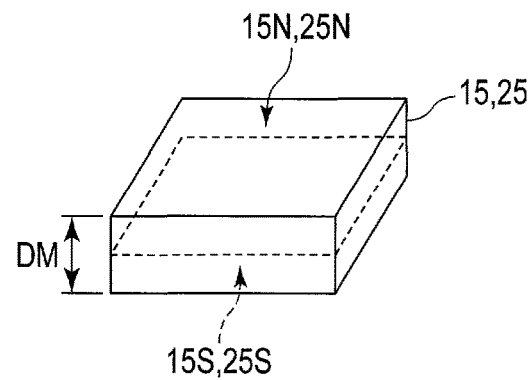
FIG. 7 is an exemplary perspective view illustrating the structure of a magnet (belonging to a first group of magnets or a second group of magnets) of the portable information processing device in the embodiment.

FIG. 7 illustrates an exemplary structure of each of the first group of the magnets 15 and the second group of the magnets 25. As illustrated in FIG. 7, each of magnets 15 and 25 is a thin rectangular solid with two wide opposite surfaces. One of the wide opposite surfaces is a pole-face 15N or 25N having a magnetic polarity of N. The other of the wide opposite surfaces is a pole-face 15S or 25S having a magnetic polarity of S. Each of magnets 15 and 25 has a thickness DM (a measurement along a vertical axis in FIG. 7). The first case 11 has a thickness D1 (a measurement along a vertical axis in FIG. 5 or FIG. 6). The second case 21 has a thickness D2 (a measurement along the vertical axis in FIG. 5 or FIG. 6). Thickness DM is slightly less than thickness D1 or thickness D2 (DM<D1, D2). The first group of the magnets 15 accommodated in case 11 comprise the first magnets 15a, which are arrayed along the one side 14 of the first case 11 and are arranged in such a manner that their respective pole faces 15S face the frame portion 13 constituting the one flat surface 11a of case 11 whereas their respective pole faces 15N face case bottom 17 constituting the opposite flat surface 11b of case 11, and the first magnets 15b, which are arrayed along the other side 16 of the first case 11 and are arranged in such a manner that their respective pole faces 15S face case bottom 17 of case 11 whereas their respective pole faces 15N face the one flat surface 11a of case 11. The second group of the magnets 25 accommodated in the second case 21 comprise the second magnets 25a, which are arrayed along the one side 24 of the second case 21 and are arranged in such a manner that their respective pole faces 25N face the frame portion 23 constituting the one flat surface 21a of the second case 21 whereas their respective pole faces 25S face case bottom 27 constituting the opposite flat surface 21b of the second case 21, and the second magnets 25b, which are arrayed along the other side 26 of the second case 21 and are arranged in such a manner that their respective pole faces 25N face case bottom 27 of the second case 21 whereas their respective pole faces 25S face the one flat surface 21a of the second case 21.

The kind of magnets 15 and 25 is not a matter in particular. Permanent magnets may be suitable. Electromagnets may be applicable. In the embodiment, however, rare earth permanent magnets, such as neodymium, are employed. Using ferromagnets makes it possible to cause each of magnets 15 and a corresponding one of magnets 25 to attract each other by their respective magnetic forces, even if the frame sections 13, 23 and case bottoms 17 and 27 are interposed between magnets 15 and magnets 25. Furthermore, each one of magnets 15 and a corresponding one of magnets 25 intensely attract each other. Accordingly, the first unit 1 and the second unit 2 will be automatically positioned. It is not necessary to provide any engaging members (for example, pins, holes, etc.) for positioning cases 11 and 21. The structure for positioning and uniting the first unit 1 and the second unit 2 is simple. The first unit 1 and the second unit 2 which are suitably positioned and united may be easily separated from each other by pulling apart the first unit 1 and the second unit 2 against the attractive force acting between each one of magnets 15 and a corresponding one of magnets 25. If powerful magnetic force should not be required for positioning and uniting of the first unit 1 and the second unit 2, it may be possible to make the first group of the magnets 15 or the second group of the magnets 25 from ferromagnetic bodies, such as ferrous oxide, instead of magnets, for example.

Since magnets 15 and 25 are used in the embodiment as mentioned above, it will be possible to unitedly place the first unit 1 and the second unit 2 one upon the other with a simple structure compared with a case of using, for example, a hinge structure. Furthermore, there is no need to further provide besides magnets 15 and 25 any engaging members for assisting positioning. Accordingly, slimming down of the first unit 1 and the second unit 2 will be achieved. When carrying the information processing device 10, it is not necessary to walk around with a case etc., for example. Therefore, portability and convenience will be markedly improved.

Figure 8:
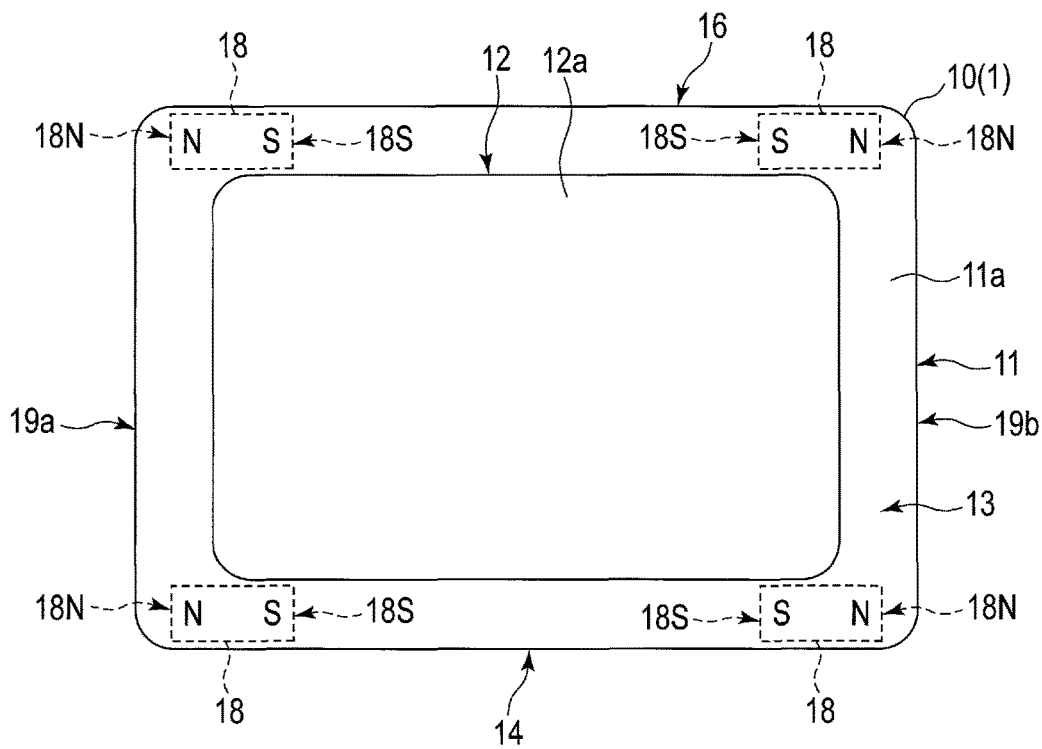
FIG. 8 is an exemplary view illustrating another exemplary magnet arrangement applicable to the first unit of the portable information processing device in another embodiment.

When the first unit 1 and the second unit 2 are in the first state in the aforementioned embodiment, and when the orientation of the first unit 1 and the orientation of the second unit 2 are not required to be restricted to the aforementioned exemplary state in which the one side 14 of case 11 and the one side 24 of case 21 are flush with each other and the one side 16 of case 11 and the other side 26 of case 21 are flush with each other, the following device structure may be applicable. Namely, it is possible to arrange magnets 18 in case 11 as illustrated in FIG. 8. Specifically, each of magnets 18 may be placed in case 11 in such a manner that one of its two pole faces 18N and 18S faces one of two end surfaces 19a and 19b and the other of its two pole faces 18N and 18S faces the other of the two end surfaces 19a and 19b. Similarly, magnets 28 may be arranged in case 21 as illustrated in FIG. 9. Specifically, each of magnets 28 may be placed in case 21 in such a manner that one of its two pole faces 28N and 28S faces one of two end surfaces 29a and 29b and the other of its two pole faces 28N and 28S faces the other of the two end surfaces 29a and 29b.

Moreover, the first group of the magnets 18 is arranged at four respective corners of case 11, and the second group of the magnets 28 is arranged at four respective corners of case 21. The first group of the magnets 18 is arranged in case 11 in such a manner that their respective pole faces facing the inner side of case 11 have the same magnetic polarity. The second group of the magnets 28 is arranged in case 21 in such a manner that their respective pole faces facing the inner side of case 21 have the same magnetic polarity. It should be noted here that the first group of the magnets 18 and the second group of the magnets 28 arranged in the respective cases are positioned to be opposite in magnetic polarity as illustrated in FIG. 8 and FIG. 9. Similarly to the embodiment mentioned above, a position obtained by projecting each of magnets 18 along the thickness of case 11 coincides with a position obtained by projecting each of magnets 28 along the thickness of case 21.

FIG. 8 illustrates a state where four magnets 18, each having a pole face 18S and a pole face 18N, are arranged in case 11 in such a manner that pole face 18S of each of magnets 18 faces the inner side of case 11 and pole face 18N of each of magnets 18 faces the outer side of case 11. Correspondingly, FIG. 9 illustrates a state where four magnets 28, each having a pole face 28N and a pole face 28S, are arranged in case 21 in such a manner that pole face 28N of each of magnets 28 faces the inner side of case 21 and pole face 28S of each of magnets 28 faces the outer side of case 21.

When the first group of the magnets 18 and the second group of the magnets 28 are arranged in this way, and when the first unit 1 and the second unit 2 are brought in the first state, the orientation of the first unit 1 and the orientation of the second unit 2 can be changed variously. Namely, they can be arranged not only in such a manner that the one side 14 of case 11 and the one side 24 of case 21 are flush with each other but also in such a manner that the one side 14 of case 11 and the other side 26 of case 21 are flush with each other (hereinafter referred to as a "third state"). Even if the first unit 1 and the second unit 2 are in the third state, each of the first group of the magnets 18 and a corresponding one of the second group of the magnets 28 will surely attract each other.

Moreover, even when the first unit 1 and the second unit 2 are in the second state, the orientation of the first unit 1 and the orientation of the second unit 2 can be changed variously. Namely, they can be arranged not only in such a manner that the one side 14 of case 11 and the other side 26 of case 21 are flush with each other but also in such a manner that the one side 14 of case 11 and the one side 24 of case 21 are flush with each other (hereinafter referred to as a "fourth state"). Even if the first unit 1 and the second unit 2 are in the fourth state, each of the first group of the magnets 18 and a corresponding one of the second group of the magnets 28 will surely attract each other.

Thereby, the first unit 1 and the second unit 2 can be unitedly placed one upon the other, without caring about the orientation of the first unit 1 and the orientation of the second unit 2, that is, even if they are not only in the first state or in the second state but also in any of the third state and the fourth state. Furthermore, it is possible to reverse the orientation of each of the magnets illustrated in FIG. 8 and FIG. 9. Specifically, it is possible to arrange the four magnets 18 in such a manner that pole face 18N of each of the four magnets 18 faces the inner side of case 11, and to arrange the four magnets 28 in such a manner that pole face 28S of each of the four magnets 28 faces the inner side of case 21. Even this modification makes it possible to unitedly place the first unit 1 and the second unit 2 one upon the other and to cause each of magnets 18 and a corresponding one of magnets 28 to attract each other regardless of whether the first unit 1 and the second unit 2 are brought in any of the first state to the fourth state.

FIG. 10 illustrates an exemplary structure of each of the first group of the magnets 18 and the second group of the magnets 28. As illustrated in FIG. 10, magnets 18 and 28 are flat rectangular solids similarly to magnets 15 and 25. Each of magnets 18 and 28 has two end faces, one of which is a pole face 18N or 28N having a magnetic polarity of N, and the other of which is a pole face 18S or 28S having a magnetic polarity of S. Any suitable material may be used for magnets 18 and 28. Electromagnets may be used. Rare earth permanent magnets, such as neodymium, may be applicable.

The four first group of the magnets 18 are arranged at the four respective corners of case 11 in such a manner that each of the first group of the magnets 18 extends along the one side 14 or the other side 16 with its two pole faces 18S and 18N facing either one of the two end surfaces 19a and 19b. Moreover, the first group of the magnets 18 in case 11 are between the frame section 13 and case bottom 17. Similarly, the four second group of the magnets 28 are arranged at the four respective corners of case 21 in such a manner that each of the second group of the magnets 28 extends along the one side 24 or the other side 26 with its two pole faces 28S and 28N facing either one of the two end surfaces 29a and 29b. Moreover, the second group of the magnets 28 in case 21 are between the frame section 23 and case bottom 27.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable information processing device comprising:
first and second units, each a first case, being a flat approximately rectangular solid case, comprising a display section on a flat surface of the first case;
a second case, being a flat approximately rectangular solid case, comprising an interface section on a flat surface of the second case, the first case and the second case overlap one another in both of a first state and a second state, the first state being a state in which the display section of the first case faces the interface section, the second state being a state in which an opposite flat surface of the first case faces the interface section for use as a tablet;
a first magnet provided on one side of the first case, the first magnet being arranged such that a first magnetic polarity is at a side of the flat surface comprising the display section, and a second magnetic polarity is at a side of the opposite flat surface;
a second magnet provided on the one side of the first case, the second magnet being arranged such that magnetic polarities at the side of the flat surface comprising the display section and the side of the opposite flat surface match the magnetic polarities of the first magnet;
a third magnet provided on an other side of the first case, the third magnet being arranged such that the second magnetic polarity is at the side of the flat surface comprising the display section, and the first magnetic polarity is at the side of the opposite flat surface;
a fourth magnet provided on the other side of the first case, the fourth magnet being arranged such that magnetic polarities at the side of the flat surface comprising the display section and the side of the opposite flat surface match the magnetic polarities of the third magnet;
a fifth magnet provided on one side of the second case, the fifth magnet being arranged such that a magnetic polarity at the side of the flat surface comprising the interface section matches the magnetic polarity at a side of the flat surface of the third and fourth magnets;
a sixth magnet provided on the one side of the second case, the sixth magnet being arranged such that a magnetic polarity at the side of the flat surface comprising the interface section matches the magnetic polarity of the fifth magnet;
a seventh magnet provided on the other side of the second case, the seventh magnet being arranged such that a magnetic polarity at the side of the flat surface comprising the interface section matches the magnetic polarity at the side of the flat surface of the first and second magnets; and
an eighth magnet provided on the other side of the second case, the eighth magnet being arranged such that a magnetic polarity at the side of the flat surface comprising the interface section matches the magnetic polarity of the seventh magnet, wherein
in a state in which the first case is placed upon the second case in the first state, the first magnet, the second magnet, the third magnet, and the fourth magnet at the side of the flat surface of the first case attract the fifth magnet, the sixth magnet, the seventh magnet, and the eighth magnet at the side of an opposing flat surface of the second case, respectively, and
in a state in which the first case is placed upon the second case in the second state, the first magnet, the second magnet, the third magnet, and the fourth magnet at the side of the opposite flat surface of the first case attract the seventh magnet, the eighth magnet, the fifth magnet, and the sixth magnet at the side of the opposing flat surface of the second case, respectively.

2. The portable information processing device of claim 1, wherein a thickness of each of the first magnet, the second magnet, the third magnet, and the fourth magnet is slightly less than a thickness of the first case.

3. The portable information processing device of claim 1, wherein a thickness of each of the fifth magnet, the sixth magnet, the seventh magnet, and the eighth magnet is slightly less than a thickness of the second case.

4. A portable information processing device comprising:
a first case, being a flat approximately rectangular solid case, comprising a display section on a flat surface of the first case;

a second case, being a flat approximately rectangular solid case, comprising an interface section on a flat surface of the second case, the first case and the second case overlap one another in both of a first state and a second state, the first state being a state in which the display section of the first case faces the interface section, the second state being a state in which an opposite flat surface of the first case faces the interface section for use as a tablet;

a first magnet provided on one side of the first case to be parallel with the flat surface, a first magnetic polarity and a second magnetic polarity existing between the flat surface and the opposite flat surface of the first case;

a second magnet provided on the one side of the first case to be parallel with the flat surface, the first magnetic polarity and the second magnetic polarity existing between the flat surface and the opposite flat surface of the first case oppositely to the magnetic polarities of the first magnet;

a third magnet provided on an other side of the first case to be parallel with the flat surface, magnetic polarities of the third magnet existing between the flat surface and the opposite flat surface of the first case, and orientations of the magnetic polarities of the third magnet being the same as the orientations of the first magnet;

a fourth magnet provided on an other side of the first case to be parallel with the flat surface, magnetic polarities of the fourth magnet existing between the flat surface and the opposite flat surface of the first case, and orientations of the magnetic polarities of the fourth magnet being the same as the orientations of the second magnet;

a fifth magnet provided on one side of the second case to be parallel with the flat surface, magnetic polarities of the fifth magnet existing between the flat surface and an opposite flat surface of the second case, and orientations of the magnetic polarities of the fifth magnet being the same as the orientations of the second magnet and the fourth magnet;

a sixth magnet provided on the one side of the second case to be parallel with the flat surface, magnetic polarities of the sixth magnet existing between the flat surface and the opposite flat surface of the second case, and orientations of the magnetic polarities of the sixth magnet being the same as the orientations of the first magnet and the third magnet;

a seventh magnet provided on an other side of the second case to be parallel with the flat surface, magnetic polarities of the seventh magnet existing between the flat surface and the opposite flat surface of the second case, and orientations of the magnetic polarities of the seventh magnet being the same as the orientations of the fifth magnet; and an eighth magnet provided on the other side of the second case to be parallel with the flat surface, magnetic polarities of the eighth magnet existing between the flat surface and the opposite flat surface of the second case, and orientations of the magnetic polarities of the eighth magnet being the same as the orientations of the sixth magnet, wherein in a state in which the first case is placed upon the second case in the first state, the first magnet, the second magnet, the third magnet, and the fourth magnet at the side of the flat surface of the first case attract the fifth magnet, the sixth magnet, the seventh magnet, and the eighth magnet at the side of an opposing flat surface of the second case, respectively, and in a state in which the first case is placed upon the second case in the second state, the first magnet, the second magnet, the third magnet, and the fourth magnet at the side of the opposite flat surface of the first case attract the seventh magnet, the eighth magnet, the fifth magnet, and the sixth magnet at the side of the opposing flat surface of the second case, respectively.

5. The portable information processing device of claim 4, wherein a thickness of each of the first magnet, the second magnet, the third magnet, and the fourth magnet is slightly less than a thickness of the first case.

6. The portable information processing device of claim 4, wherein a thickness of each of the fifth magnet, the sixth magnet, the seventh magnet, and the eighth magnet is slightly less than a thickness of the second case.

* * * * *